United States Patent
Akashi

[19]

[11] Patent Number: 5,987,151
[45] Date of Patent: *Nov. 16, 1999

[54] APPARATUS FOR DETECTING VISUAL AXIS

[75] Inventor: Akira Akashi, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/775,894

[22] Filed: Jan. 2, 1997

Related U.S. Application Data

[63] Continuation of application No. 08/230,515, Apr. 20, 1994, abandoned.

[30] Foreign Application Priority Data

Apr. 22, 1993 [JP] Japan .................................... 5-117638

[51] Int. Cl.⁶ ...................................................... G06K 9/00
[52] U.S. Cl. .......................... 382/100; 382/199; 382/288; 396/51; 351/210
[58] Field of Search ..................................... 382/103, 115, 382/117, 128, 199, 288, 100; 348/78; 396/51; 351/209, 210

[56] References Cited

U.S. PATENT DOCUMENTS

| | | | |
|---|---|---|---|
| 4,595,990 | 6/1986 | Garwin et al. | 708/141 |
| 5,016,282 | 5/1991 | Tomono et al. | 382/117 |
| 5,070,401 | 12/1991 | Salvati et al. | 348/141 |
| 5,231,674 | 7/1993 | Cleveland et al. | 382/117 |
| 5,296,888 | 3/1994 | Yamada | 396/51 |

FOREIGN PATENT DOCUMENTS

| | | | |
|---|---|---|---|
| 1-274736 | 11/1989 | Japan | A61B 3/10 |
| 3-177827 | 8/1991 | Japan | G03B 13/36 |
| 4-347131 | 12/1992 | Japan | A61B 3/113 |

OTHER PUBLICATIONS

English Translation of Japanese Laid—Open Patent Application No. 4–347131, Aug. 1994.

Bani–Hashemi, "Finding the Aspect–Ratio of an Imaging System." Proceedings 1991 IEEE Computer Society Conference on Computer Vision and Pattern Recognition, pp. 122–126, Jun. 1991.

*Primary Examiner*—Jon Chang
*Attorney, Agent, or Firm*—Fitzpatrick, Cella, Harper & Scinto

[57] ABSTRACT

A visual axis detecting apparatus includes a two-dimensional image sensor having a plurality of detecting lines for receiving light from an eye, a first calculator for (i) detecting a change of luminance for neighboring pixels on the detecting lines, for (ii) calculating a number of pixels whose luminance is changed and a position of a center of gravity of the change of luminance as coordinates of an edge of a pupil of the eye from an amount of the change of luminance, for (iii) obtaining a plurality of coordinates of the edge of the pupil from the plurality of detecting lines, and for (iv) performing a correcting calculation of the plurality of coordinates of the edge of the pupil on the basis of an aspect ratio of a pixel of the image sensor, a second calculator for calculating a position of a center of the pupil from the plurality of coordinates of the edge of the pupil corrected by the first calculator, and a visual axis calculator for calculating a position of a visual axis by using the position of the center of the pupil.

9 Claims, 9 Drawing Sheets

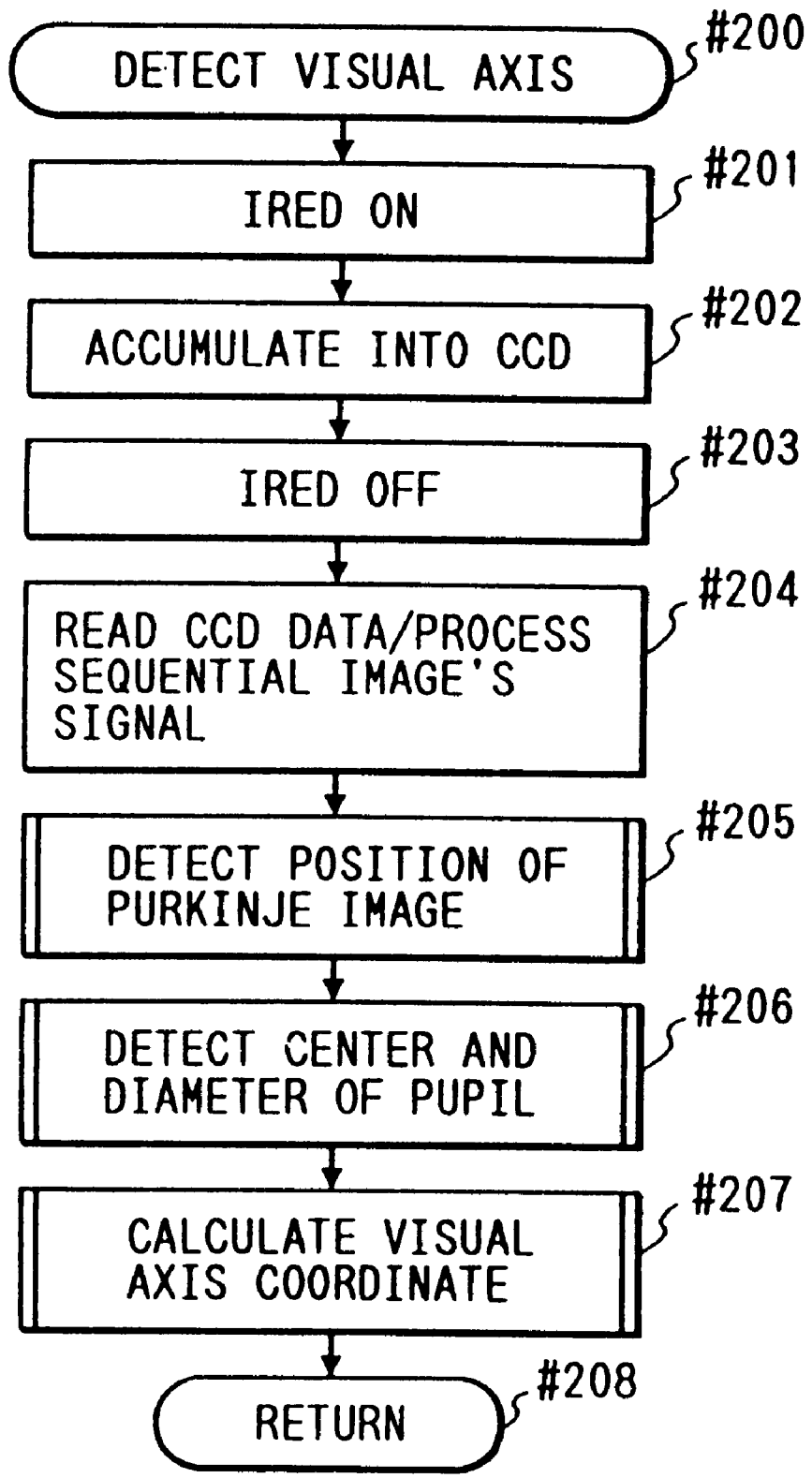

APPARATUS FOR DETECTING VISUAL AXIS

This application is a continuation of application Ser. No. 08/230,515, filed Apr. 20, 1994, now abandoned.

BACKGROUND OF THE INVENTION

1. Field of the Invention

The present invention relates to an improvement of a visual axis detecting apparatus, incorporated into an optical instrument such as a camera, etc., for detecting an axis of direction toward a gazing point at which a viewer watches, i.e., detecting a so-called visual axis (line of sight).

2. Description of the Related Art

There have hitherto been proposed a variety of apparatuses (e.g., eye cameras) for detecting which position on a viewing plane a viewer watches, i.e., detecting a so-called visual axis (line of sight).

In, e.g., Japanese Patent Laid-Open Application No. 1-274736, a parallel light beam from a light source is projected on an anterior eye part of a viewer's eye; and a visual axis is obtained by detecting positions of a pupil image and a cornea reflection image made by the light reflected from the cornea.

FIG. 1 and FIGS. 2A and 2B are diagrams showing a principle of the visual axis detecting method.

To start with, an explanation will be given with reference to FIG. 1. Respective infrared light emitting diodes (hereinafter abbreviated as IREDs) 13a, 13b are arranged in substantial symmetry with respect to an optical axis I of a light receiving lens 12. The IREDs divergently illuminate an eye of an eyeball of each photographer with light.

A cornea 16 of the eyeball 15 is illuminated with an infrared light beam from the IREDs 13a, 13b. At this time, cornea reflection images d, e with respect to a portion of each infrared light bean reflected by the surface of the cornea 16 are condensed by the light receiving lens 12. The images are re-formed in positions d', e' on the image sensor 14. Further, an image of the pupil of the eyeball 15 illuminated by the IREDs 13a, 13b is also formed on the image sensor 14.

Let xc be an x-coordinate of a center c of a circle (termed a pupil circle) having boundaries (a, b) between a pupil 19 and an iris 17, the x-coordinate on the image sensor 14 being determined as xc' (unillustrated).

FIG. 2A illustrates an eyeball image projected on the image sensor 14 of FIG. 1. FIG. 2B shows an output waveform of a video (image) signal transmitted from the image sensor 14 on a line (I)–(I') in FIG. 2A.

Referring to FIG. 2A, the numeral 50 designates a reflection image of a white part of the eyeball 15, and 51 represents a pupil reflection image. Further, the symbols 52a, 52b indicate cornea reflection images of a pair of IREDs 13a, 13b. These cornea reflection images are called Purkinje images.

Turning to FIG. 2B, two maximum points in a video signal 60 correspond to a pair of Purkinje images.

Referring back to FIG. 1, the x-coordinate of the midpoint between the Purkinje images d and e coincides with an x-coordinate xo of a center-of-curvature O of the cornea 16. Therefore, a rotational angle $\theta$ of the optical axis II of the eyeball 15 substantially satisfies the following relational expression:

$$(A1 * L_{oc}) * \sin\theta \simeq xc - (xd + xe)/2 \tag{1}$$

where xd, xe are the x-coordinates of positions where the Purkinje images d, e are formed, $L_{oc}$ is the standard distance from the center-of-curvature O of the cornea 16 to the center c of the pupil 19, and A1 is the coefficient in consideration of a difference between individuals with respect to the distance $L_{oc}$. Hence, the rotational angle $\theta$ of the optical axis II of the eyeball 15 can be obtained by detecting the positions of the respective characteristic points (the Purkinje images d, e and the center-of-pupil c) projected on a part of the image sensor 14 in the visual axis calculation processor. At this time, the above formula (1) is rewritten such as:

$$\beta(A1 * L_{oc}) * \sin\theta \simeq xc' - (xd' + xe')/2 \tag{2}$$

where $\beta$ is the magnification determined by a position of the eyeball 15 with respect to the light receiving lens 12 and substantially obtained as a function of a distance of $|xd'-xe'|$ between the Purkinje images. The rotational angle $\theta$ of the optical axis II of the eyeball 15 is also rewritten by:

$$\theta \simeq \text{ARCSIN}\{(xc'-xf')/\beta/(A1*L_{oc})\} \tag{3}$$

However, $$xf' \simeq (xd'+xe')/2.$$

By the way, the visual axis of the eyeball 15 of the photographer is not identical with the optical axis II thereof. Accordingly, when calculating the rotational angle $\theta$ of the optical axis II in the horizontal direction, a visual axis $\theta H$ of the photographer in the horizontal direction is obtained by performing an angular correction $\delta$ between the optical axis II and the visual axis. The visual axis $\theta H$ of the photographer in the horizontal direction is given by:

$$\theta H = \theta \pm (B1 * \delta) \tag{4}$$

where B1 is the coefficient in consideration of the difference between individuals with respect to the correction angle $\delta$ between the optical axis II and the visual axis of the eyeball 15. In connection with the symbol ±, if an angle of rightward rotation with respect to the photographer is herein assumed to be positive, the symbol + is selected when the photographer looks in the viewing apparatus with the left eye, but the symbol − is selected when seeing through it with the right eye.

Further, the same Figure shows an example where the eyeball of the photographer rotates within a z-x plane (e.g., a horizontal plane). The detection is, however, similarly possible even in such a case that the photographer's eyeball rotates within a z-y plane (e.g., a perpendicular plane). However, a component of the visual axis of the photographer in the vertical direction coincides with a component $\theta'$ of the optical axis II of the eyeball 15 in the vertical direction, and, hence, a visual axis $\theta V$ in the vertical direction is expressed such as:

$$\theta V = \theta'.$$

Moreover, in accordance with items of visual axis data $\theta H$, $\theta V$, the positions (xn, yn) on a focusing screen of the finder field the photographer sees are obtained as follows:

$$xn \simeq m * \theta H \tag{5}$$

$$\simeq m * [\text{ARCSIN}\{(xc' - xf')/\beta/(A1 * L_{oc})\} \pm (B * \alpha)]$$

$$yn \simeq m * \theta V$$

where m is the constant determined by a finder optical system of the camera.

Herein, obtaining values of the coefficients A1, B1 for correcting the difference between individuals with respect to the eyeball 15 of the photographer involves the following steps. The photographer is made to fix the eye on a target located in a predetermined position within the camera finder. A position of the target is obtained by making coincident with a position of the fixing point calculated in accordance with the above formula (5).

Normally, the calculations for obtaining the visual axis and the gazing point of the photographer are executed by software of a microcomputer of the visual axis operation processor on the basis of the respective formulae given above.

When obtaining the coefficients for correcting the difference in the visual axis between individuals, the on-focusing-screen position of the visual axis of the photographer looking in the camera finder is calculated by use of the above formula (5). Data on the visual axis information is utilized for adjusting the focusing of the phototaking lens or controlling an exposure or the like.

The visual axis is actually obtained in the following manner. An eyeball image on the image sensor 14 is processed by the microcomputer or the like. The above-stated Purkinje images and the pupil circle (image) are detected. Based on positional data thereof, the visual axis is calculated.

A specific method is disclosed in Japanese Patent Laid-Open Application No. 4-347131.

The same Application shows the way of obtaining the pupil circle as follows. An eyeball video signal is read from the image sensor, and, meanwhile, a luminance difference of a boundary between the pupil and the iris is sequentially extracted as a signal edge, and its coordinates are stored. Then, when finishing the reading process of the eyeball image, a circle is estimated based on, e.g., the least squares method by use of a plurality of pupil edge coordinates stored. This circle is regarded as a pupil circle.

FIGS. 3A, 3B and 3C are diagrams of assistance in explaining an outline of this processing.

FIG. 3A depicts the eyeball image, wherein the Purkinje images are omitted. A plurality of white dots arranged around a pupil circle 51 are the pupil edge. The reference numeral 70-1 represents one of these dots. Further, FIG. 3B illustrates only the pupil edge of FIG. 3A.

The numeral 75 designates a circle estimated based on the least squares method by use of these items of edge data. FIG. 3C also illustrates this estimated circle, wherein (xc, yc) are the center coordinates of the circle, and rc is the radius thereof.

According to the conventional pupil edge extracting method, it is a common practice that edge characteristics are luminance variations in the eyeball image with respect to the iris and the pupil, and coordinates of an edge start point or an edge end point or a mid-point between the two points serve as pupil edge coordinates.

There was also invented another extracting method, as disclosed in Japanese Patent Laid-Open Application No. 3-177827, of determining the edge coordinates by use of Newton's method from data of respective points of the edge portion.

In any method, however, it can be said that the extracting method is very weak against noise.

SUMMARY OF THE INVENTION

The object of the present invention is to provide a method for detecting a pupil or a visual axis and an image pick-up apparatus whereby a pupil or a visual axis of an eye can be detected with higher accuracy.

In one aspect, the present invention for detecting a pupil comprises first signal forming means for converting light reflected by an eye to an electrical signal to form a plurality of signal arrays corresponding to a boundary of a plurality of portions between a pupil and an iris of the eye, wherein each of the plurality of signal arrays is formed by sampling the electrical signal by a predetermined pitch; second signal forming means for processing each of the plurality of signal arrays to form a plurality of signals for indicating a position of the boundary thereof by a pitch having an accuracy of less than the pitch for sampling; and means for detecting a circle for indicating the pupil through the method of least squares by using the plurality of signals for indicating a position of the boundary thereof.

In another aspect, the present invention for detecting a visual axis comprises a first signal forming step for converting light reflected by an eye to an electrical signal to form a plurality of signal arrays corresponding to a boundary of a plurality of portions between a pupil and an iris of the eye, wherein each of the plurality of signal arrays is formed by sampling the electrical signal by a predetermined pitch; a second signal forming step for processing each of the plurality of signal arrays to form a plurality of signals for indicating a position of the boundary thereof by a pitch having an accuracy of less than the pitch for sampling; a step for detecting a circle for indicating the pupil through the method of least squares by using the plurality of signals for indicating a position of the boundary thereof; and a step for detecting the visual axis of the eye by using the circle for indicating the pupil.

In yet another aspect, the present invention comprises means for forming an image of an object; means for observing the image of an object; visual axis detection means for detecting a visual axis of a user's eye, wherein the visual axis detection means includes first signal forming means for converting light reflected by the eye to an electrical signal to form a plurality of signal arrays corresponding to a boundary of a plurality of portions between a pupil and an iris of the eye, wherein each of the plurality of signal arrays is formed by sampling the electrical signal by a predetermined pitch; second signal forming means for processing each of the plurality of signal arrays to form a plurality of signals for indicating a position of the boundary thereof by a pitch having an accuracy of less than the pitch for sampling; and means for detecting a circle for indicating the pupil through the method of least squares by using the plurality of signals for indicating a position of the boundary thereof.

BRIEF DESCRIPTION OF THE DRAWINGS

Other objects and advantages of the present invention will become apparent during the following discussion in conjunction with the accompanying drawings, in which:

FIG. 6 is a flowchart showing an outline of actions when detecting a visual axis in the first embodiment of this invention;

DETAILED DESCRIPTION OF THE PREFERRED EMBODIMENTS

The present invention will hereinafter be described in detail by way of illustrative embodiments.

Figure 4:
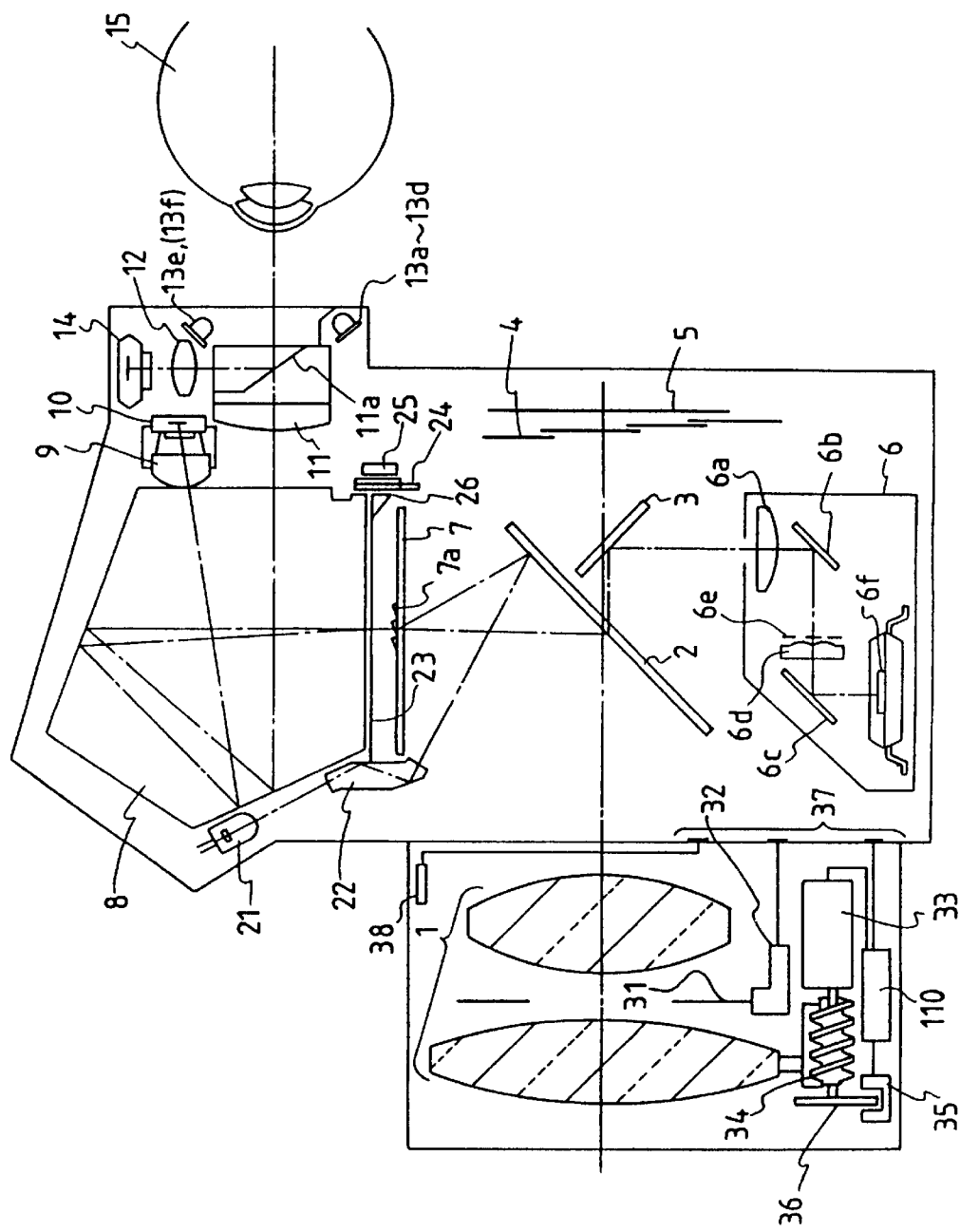
FIG. 4 is a schematic view illustrating principal elements when an apparatus in a first embodiment of this invention is applied to a single-lens reflex camera.

FIG. 4 is a schematic view illustrating principal elements of a single-lens reflex camera provided with a visual axis detecting apparatus in a first embodiment of the present invention.

Referring to FIG. 4, a phototaking lens unit 1 is shown in the form of two pieces of lens elements for convenience, but is, as a matter of fact, further constructed of a multiplicity of lens elements. A main mirror 2 is, as depicted in FIG. 4, obliquely disposed on a photographic optical path for viewing an image of an object through a finder system or is moved off the projection optical path for photographing. A sub mirror 3 reflects a beam of light passing through the main mirror 2 toward a focus detecting device 6 provided in a lower portion of a camera body, which will be mentioned later.

The numeral 4 designates a shutter. A photosensitive member 5 is a solid-state image pick-up device such as a CCD or MOS type or a silver salt film, or an image pickup tube such as a vidicon, or the like.

The focus detecting device 6 comprises a field lens 6a disposed in the vicinity of an image forming plane and reflecting mirrors 6b, 6c. The focus detecting device 6 also comprises a secondary imaging lens 6d, an aperture 62 and a line sensor unit 6f constructed of a plurality of CCDs.

The focus detecting device 6 in this embodiment detects a focusing point in a known phase-difference detecting system.

A focusing screen 7 is disposed on a predetermined image forming plane of the phototaking lens unit 1. A pentaprism 8 serves to change a finder optical path. An imaging lens 9 and a photometric sensor 10 serve to detect a luminance of an object within each view picture (field). The imaging lens 9 gives a conjugate relationship between the focusing screen 7 and photometric sensor 10 through a reflection optical path within the pentaprism 8.

Next, an eyepiece 11 including a beam splitter 11a is disposed in the rear of a beam exiting surface of the pentaprism 8. An eyeball 15 of the photographer gazes on the focusing screen 7 through the eyepiece 11. The beam splitter 11a is constructed of, e.g., a dichroic mirror which transmits visible light but reflects infrared light.

The numeral 12 represents a light receiving lens. An image sensor 14 (area sensor) has a plurality of photoelectric converting elements such as CCDs which are two-dimensionally arranged. The image sensor 14 is so disposed as to be optically conjugate to the vicinity of a pupil of the eyeball 15 of the photographer in a predetermined position with respect to the light receiving lens unit 12. IREDs (infrared light emitting diodes) 13a–13f each serve as an illumination light source.

A high-luminance superimpose LED 21 enables the viewer to visually recognize a display element superimposed with a bright object. A light beam emitted from the LED 21 is reflected by the main mirror 2 via a projection prism 22. The light beam is then deflected in a perpendicular direction by micro prism arrays 7a provided in the display element of the focusing screen 7. The deflected light beam reaches the eye 15 of the photographer via the pentaprism 8 and the eyepiece 11.

Then, these micro prism arrays 7a are formed in frame-like shapes in a plurality of positions (focus detecting positions) corresponding to focus detecting areas of the focus detecting apparatus 6. The micro prism arrays 7a are illuminated with the light from five pieces of superimposed LEDs 21 (termed LED-L1, LED-L2, LED-C, LED-R1, LED-R2, respectively) corresponding thereto.

A field mask 23 forms a finder field area. An in-finder LCD 24 displays photographic data outside the finder field. The in-finder LCD 24 is illuminated with light from LED (F-LED) 25.

The light beam transmitted through the in-finder LCD 24 is guided via a triangular prism 26 to an interior of the finder field. Then, the photographic data are displayed outwardly of the finder field, and the photographer can thus obtain the photographic data.

Figure 5:
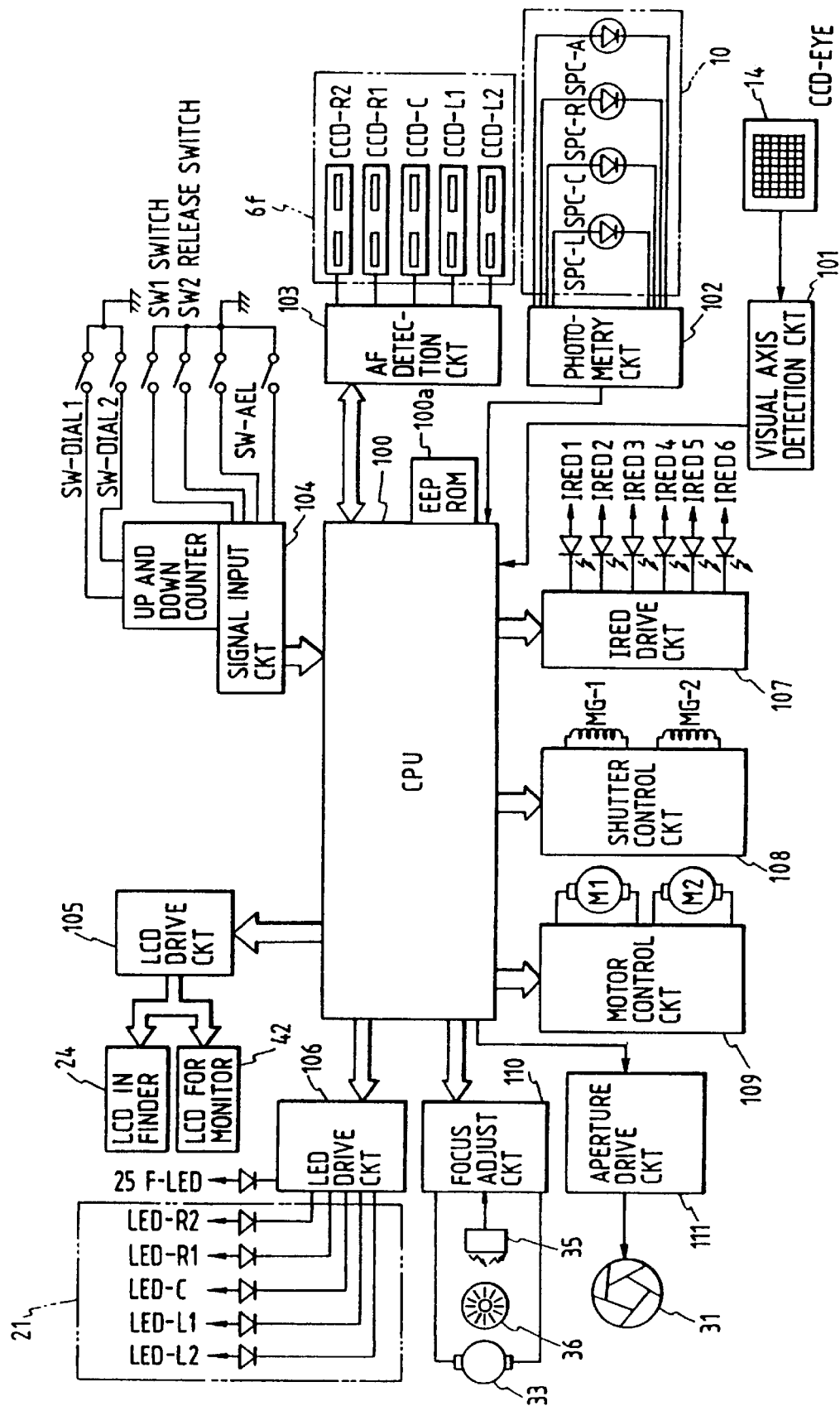
FIG. 5 is a constructive block diagram showing principal elements of the camera of FIG. 4.

A diaphragm (aperture) 31 is provided in the phototaking lens unit 1. A diaphragm drive unit 32 includes a diaphragm drive circuit 111 which will hereinafter be explained referring to FIG. 5. The numeral 33 denotes a lens drive motor. A lens drive member 34 is composed of a drive gear or the like. A photo interrupter 35 detects rotations of a pulse plate 36 interlocking with the lens drive member 34 and transfers the detection thereof to a lens focus adjusting circuit 110. The focus adjusting circuit 110 drives the lens drive motor 33 by a predetermined quantity on the basis of this item of data and data about a lens drive quantity given from the camera side. The phototaking lens unit 1 is thereby moved to an in-focus position. A mount contact 37 serves as an interface between a known camera and the lens. FIG. 5 is a circuit diagram illustrating an electric configuration of a circuit built in the single-lens reflex camera having the above construction. The same elements as those in FIG. 4 are marked with like numerals.

Connected to a microcomputer-assisted central processing unit (CPU) 100 incorporated into the camera body are a visual axis detection circuit 101, a photometry circuit 102, an AF detection circuit 103, a signal input circuit 104, an LCD drive circuit 105, an LED drive circuit 106, an IRED drive circuit 107, a shutter control circuit 108 and a motor control circuit 109. Further, the focus adjusting circuit 110 and the diaphragm drive circuit 111 provided in the photographing lens unit 1 transmit signals to each other via the mount contact 37 shown in FIG. 4.

An EEPROM 100a incidental to the CPU 100 serves as a storage element incorporating a function to store visual axis correction data for correcting a difference in the visual axis between individuals.

The visual axis detecting circuit 101 effects an A/D conversion on an eyeball video signal transmitted from the image sensor 14 (CCD-EYE). This item of image data is transmitted to the CPU 100. The CPU 100, as will be stated later, extracts (samples) respective eyeball image characteristic points required for detecting the visual axis in accordance with a predetermined algorithm. The CPU 100 further calculates the visual axis of the photographer based on the positions of the respective characteristic points.

The photometry circuit 102, after amplifying a signal from a photometry sensor 10, effects a logarithmic compression and an A/D conversion on this amplified signal. The photometry circuit 102 then transmits the signal as luminance data of each sensor to the CPU 100. The photometry sensor 10 in this embodiment comprises photodiodes SPC-L, SPC-C, SPC-R, SPC-A for performing photometric processes on four areas.

The line sensor unit 6f is a known CCD line sensor unit constructed of five line sensor components CCD-L2, CCD-L1, CCD-C, CCD-R1, CCD-R2 corresponding to five focus detecting points within the picture field.

The AF detecting circuit 103 A/D-converts an analog signal obtained from the line sensor unit 6f into a digital signal and transmits the digital signal to the CPU 100.

A switch SW-1 is turned ON at a first stroke of an unillustrated release button. The switch SW-1 works to start a photometric action, an AF action and a visual axis detecting action and the like. A release switch SW-2 is turned ON at a second stroke of the unillustrated release button. An AE lock switch SW-AEL is turned ON by depressing an unillustrated AE lock button. Dial switches SW-DIAL1, SW-DIAL2 are provided in an unillustrated electronic dial. An up/down counter of the signal input circuit 104, when inputting a rotation click quantity of the electronic dial, counts this rotation click quantity.

The LCD drive circuit 105 is based on a known construction for driving the liquid crystal display element LCD. The LCD drive circuit 105 enables both of a use-for-monitor LCD 42 and the in-finder LCD 24 to simultaneously display an f-number, a shutter speed and a set photographing mode and the like in accordance with signals from the CPU 100.

The LED drive circuit 106 controls the LED (F-LED) 25 and the LED 21 to light up and flash. The IRED drive circuit 107 selectively lights up the infrared light emitting diodes (IRED1–IRED6) 13a–13f according to situations. The shutter control circuit 108 controls a magnet MG-1 for tripping, when electrified, a leading curtain and a magnet MG-2 for tripping a trailing curtain. The photosensitive member 5 is thus exposed to a predetermined quantity of light. The motor control circuit 109 controls a motor M1 for winding and rewinding film and a motor M2 for charging the main mirror 2 and the shutter 4.

A camera exposure sequence is operated by the shutter control circuit 108 and the motor control circuit 109.

FIG. 6 is a flowchart showing visual axis detecting operations in the CPU 100 and the visual axis detecting circuit 101. An explanation will hereinafter be given in conjunction with this flowchart.

This operation starts with a step 200.

First, the CPU 100 selects and lights up a proper combination of IREDs among the IREDs 13a–13f for illuminating the photographer's eyeball 15 with light (step 201). The IREDs are selected depending on whether the camera is set in a horizontal or vertical position by using an unillustrated camera position sensor or whether the photographer wears spectacles or not.

Next, electric charges are accumulated for a predetermined accumulation time by the image sensor 14 (step 202). Then, simultaneously when this accumulation is ended, the IREDs are also extinguished (step 203). Subsequently, the CPU 100 reads the eyeball image of the photographer and, at the same time, sequentially performs the extracting process on characteristics of Purkinje images and a pupil (step 204).

A specific method thereof is fully stated in Japanese Patent Laid-Open Application No. 4-347131. The method is basically the same as this. The present embodiment takes, however, a different pupil edge extracting method.

This extracting method will be explained with reference to FIGS. 7A and 7B.

Figure 7A:
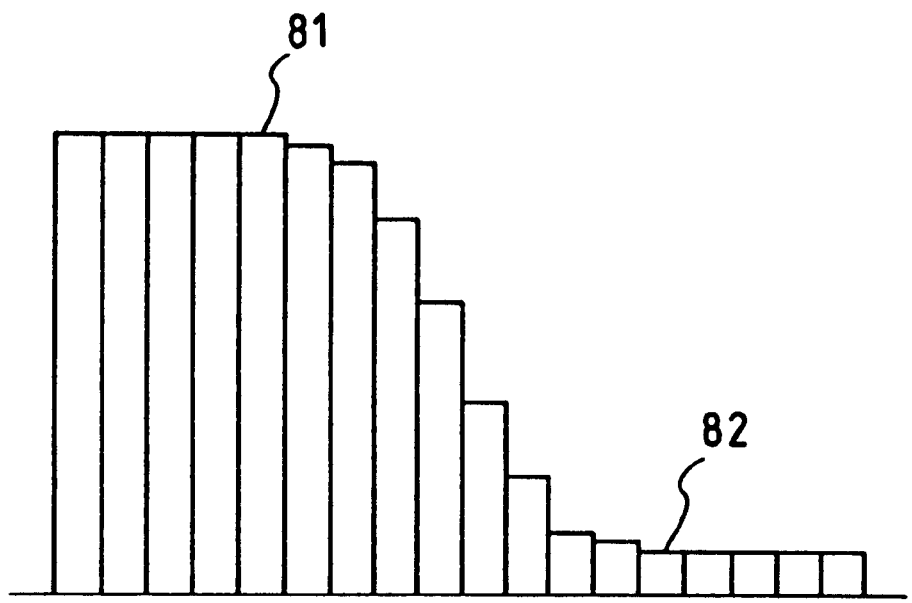
FIGS. 7A and 7B are diagrams for explaining how an extracting process of a pupil edge is performed in the first embodiment of this invention.

FIG. 7A shows one example of a plurality of digital data with respect to the left edge of the pupil, obtained by A/D conversion with a predetermined sampling pitch, wherein the axis of abscissa indicates a coordinate of the area sensor in the lateral (horizontal) direction, and the axis of ordinate indicates an output (luminance).

Referring to FIG. 7A, the luminance gradually decreases from a signal 81, and the drop of the luminance is ended with a signal 82. The left part from the signal 81 in the Figure represents an iris, while the right part from the signal 82 indicates the pupil. Then, a part ranging from the signal 81 to the signal 82 represents the so-called pupil edge.

When the pupil edge exhibits such a characteristic, the coordinates of the pupil edge have hitherto involved the use of coordinates of the signal 81 or the signal 82 or a mid-point between the signals 81 and 82 in the conventional art. According to this conventional method, however, the coordinates are determined based on data of one or two signals. The coordinates are therefore obtained on a pixel unit alone, but are quite unstable against noise.

Under such circumstances, in accordance with this embodiment, the coordinates of the pupil edge are determined by use of all the signals existing between the signals 81 and 82.

More specifically, a difference between the signals of the pupil edge is taken, and a signal barycentric position is regarded as an edge coordinate.

Let d(k) be the signals in FIG. 7A, and, for instance, the following calculation is performed:

$$e(k)=d(k-1)-d(k) \qquad (6)$$

where k represents a detected coordinate.

Figure 7B:
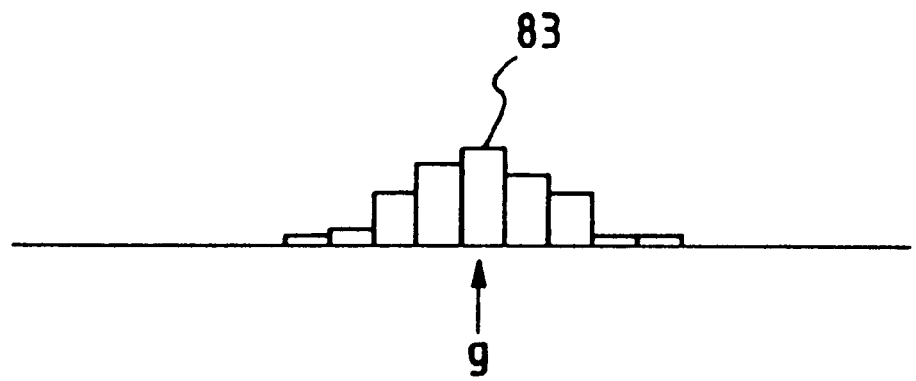

When plotting e(k), the result goes as shown in FIG. 7B (this is a filter output signal of the photoelectric converting signal). The signal e(k) is a primary difference. Hence, e(k) turns out a maximum value (signal 83) at which coordinate a variation in the signal d(k) becomes maximum. In this embodiment, a barycenter g of e(k) is obtained and serves as the pupil edge coordinate. The barycenter g is calculated by the following formula:

$$g=[\Sigma k \cdot e(k)]/\Sigma e(k) \qquad (7)$$

The barycenter g can be obtained from a value (real value) equal to or smaller than the pixel unit (dimension).

In the above formula (6), e(k) takes a positive value in the decrement signal as shown in FIG. 7A but takes a negative value in the increment signal as in the case of the right pupil edge. In this case, the barycentric calculation in the formula (7) does not function correctly, and, therefore, the calculation in the formula (6) is performed as shown below to take an absolute value.

$$e(k)=|d(k-1)-d(k)| \quad (6\text{-}1)$$

As described above, the pupil edge is detected based on the barycenter (center of parity). The coordinates can be thereby detected with a high accuracy of which dimension is equal to or smaller than the pixel unit (sampling pitch) and with stability against noise.

Referring again to FIG. 6, the reading process of the whole eyeball image is finished, and the extracting process of the characteristics of the Purkinje images and the pupil is completed. Thereafter, positions of a couple of Purkinje images are detected based on these items of data (step 205).

Figure 1:
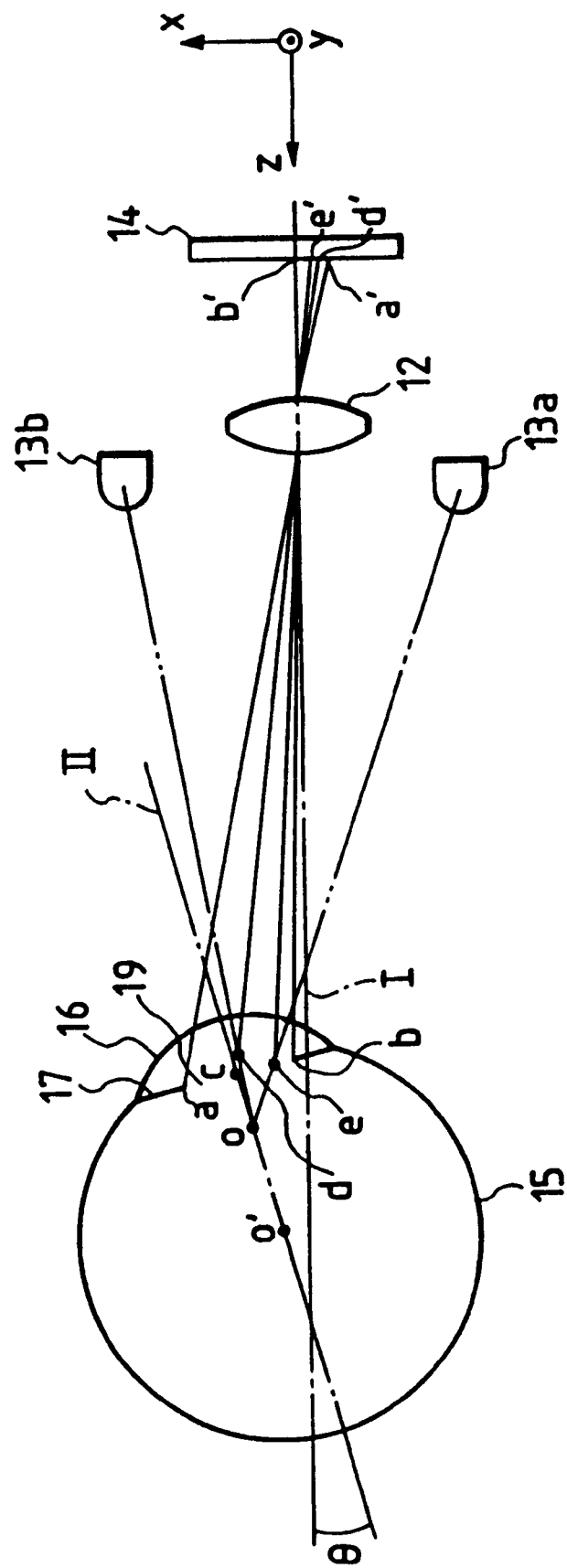
FIG. 1 is a view for explaining a principle of a visual axis detecting method.
Figure 2A:
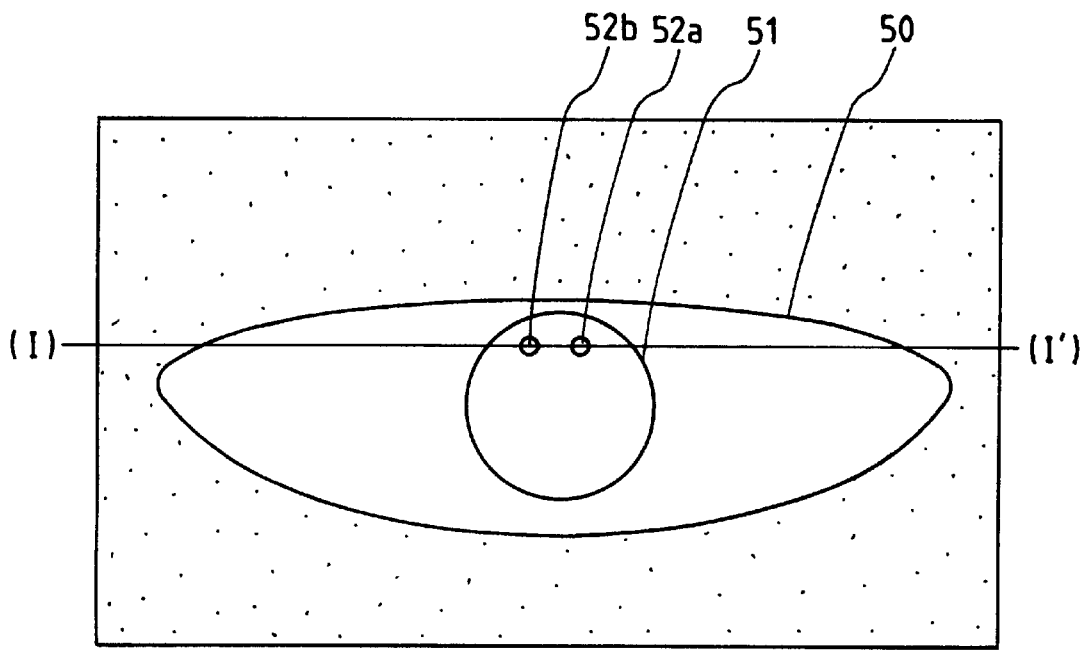
FIGS. 2A and 2B are diagrams showing an example of an eyeball image of a viewer on an image sensor.
Figure 2B:
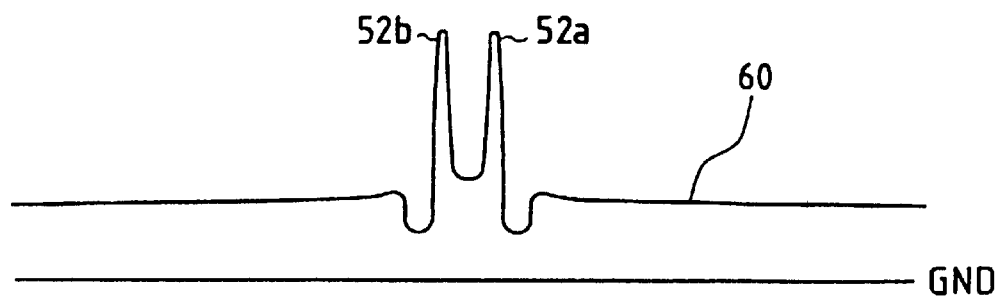
Figure 3A:
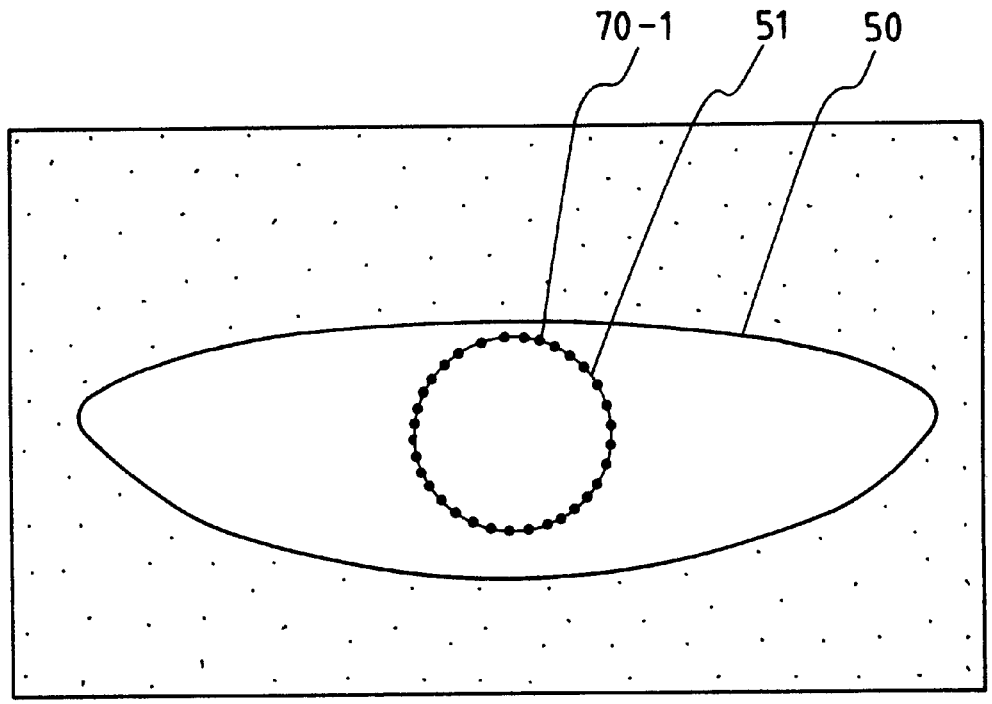
FIGS. 3A, 3B and 3C are diagrams for explaining a method of detecting a pupil circle.
Figure 3B:
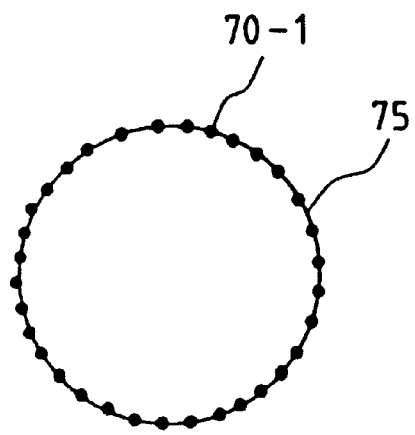
Figure 3C:
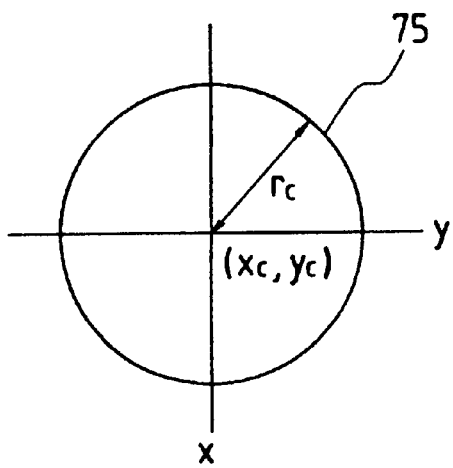

As stated earlier, the Purkinje images are defined as cornea reflection images of the eyeball and therefore appear as contacts exhibiting a high light intensity in the video signals as in the case of 52*a*, 52*b* of FIG. 2B. Hence, the couple of Purkinje images are detected according to the characteristic thereof. Positions (xd', yd'), (xe', ye') of the Purkinje images can be obtained.

The coordinates of the couple of detected Purkinje images are corrected based on an aspect ratio of the rectangular photoelectric converting element.

Now, supposing that the aspect ratio of the element (the photoelectric converting element of the image sensor 14) is [2:1] to give a rectangular shape, the coordinates expressed by the pixel unit are so doubled as to be laterally long. Accordingly, the horizontal detected coordinates in the eyeball image may be set to 1/2.

Namely, this implies such a transform that the ordinate yd' of the one-Purkinje image coordinates (xd', yd') remains unchanged, whereas the abscissa xd' is set to 1/2.

$$yd' \leftarrow yd'$$

$$xd' \leftarrow xd'/2.$$

Similarly, another Purkinje image (xe', ye') undergoes the following transform:

$$ye' \leftarrow ye'$$

$$xe' \leftarrow xe'/2.$$

Next, a center (xc', yc') and a radius rc of a circle of the pupil are detected from pupil edge coordinates data extracted in the course of the sequential process of step 204 (step 206).

The detection of the center and radius of the pupil involves the use of the least square estimate method of the circle on the basis of a plurality of extracted pupil edge data. A fiducial calculation formula thereof is, though disclosed in Japanese Patent Laid-Open Application No. 4-34713, again explained herein.

Let $(x_1, y_1), (x_2, y_2), \ldots, (x_n, y_n)$ be n-pieces of pupil edge coordinates. The center coordinates (xc, yc) and the radius rc of the estimate circle and an estimate error quantity ER employing the least squares method based on these items of data are given by:

$$xc = \{(W1 \cdot V2 - W2 \cdot W4 - (W6 - Y1 \cdot Z1) \cdot W3\}/ \quad (10)$$
$$\{2 \cdot (Y2 \cdot V1 - W5 - W6 \cdot X1/n)\}$$

-continued
$$yc = \{(W2 \cdot V1 - W1 \cdot W4 - (W7 - X1 \cdot Z1) \cdot W3\}/ \quad (11)$$
$$\{2 \cdot (Y2 \cdot V1 - W5 - W7 \cdot X1/n)\}$$

$$rc = \sqrt{\{W3 - 2 \cdot (xc \cdot X1 + yc \cdot Y1)/n + xc^2 + yc^2\}} \quad (12)$$

$$ERX = X4 - 4 \cdot xc \cdot X3 + 2(2 \cdot xc^2 + d) \cdot X2 - 4 \cdot xc \cdot d \cdot X1 + \quad (13)$$
$$Y4 - 4 \cdot yc \cdot Y3 + 2(2 \cdot yc^2 + d) \cdot Y2 - 4 \cdot yc \cdot d \cdot Y1 +$$
$$2(Z4 - 2 \cdot xc \cdot Z3 - 2 \cdot yc \cdot Z2 + 4 \cdot xc \cdot yc \cdot Z1) + (d^2 \cdot n)$$

$$ER = \sqrt{(ERX/n)} \quad (14)$$

however, $$X1=\Sigma xi, X2=\Sigma xi^2, X3=\Sigma xi^3, X4=\Sigma xi^4 \quad (15)\text{--}(18)$$

$$Y1=\Sigma yi, Y2=\Sigma yi^2, Y3=\Sigma yi^3, Y4=\Sigma yi^4 \quad (19)\text{--}(22)$$

$$Z1=\Sigma xi \cdot yi, Z2=\Sigma xi^2 \cdot yi \quad (25)\text{--}(26)$$

$$Z3=\Sigma xi \cdot yi^2, Z4=xi^2 \cdot yi^2 \quad (25)\text{--}(26)$$

further, $$V1=X2-X1^2/n \quad (27)$$

$$V2=Y2-Y1^2/n \quad (28)$$

$$W1=X3+Y3 \quad (29)$$

$$W2=Y3+Z3 \quad (30)$$

$$W3=(X2+Y2)/n \quad (31)$$

$$W4=Z1-X1 \cdot Y1/n \quad (32)$$

$$W5=(Z1-2 \cdot X1 \cdot Y1/n) \cdot Z1 \quad (33)$$

$$W6=X1 \cdot Y2 \quad (34)$$

$$W7=X2 \cdot Y1 \quad (35)$$

$$d=xc^2+yc^2-rc^2 \quad (36)$$

The center (xc, yc) and the radius rc of the circle and also the least squares estimate error quantity ER can be obtained by performing the above numerical calculations.

Now, the coordinate transform corresponding to a configuration of the photoelectric converting element is effected on the pupil edge in advance of the above operations as in the same way with the Purkinje images.

When the aspect ratio of the element (the photoelectric converting element of the image sensor 14) is set to 2:1, the following transform is performed on the n-pieces of pupil edge coordinates $(x_1, y_1), (x_2, y_2), \ldots, (x_n, y_n)$.

$$xi \leftarrow xi/2 \quad (40)$$

Figure 8A:
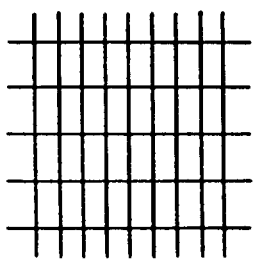
FIGS. 8A, 8B and 8C are diagrams illustrating pupil configurations and a pixel configuration of an area sensor assuming a rectangular pixel configuration in the first embodiment of this invention.
Figure 8B:
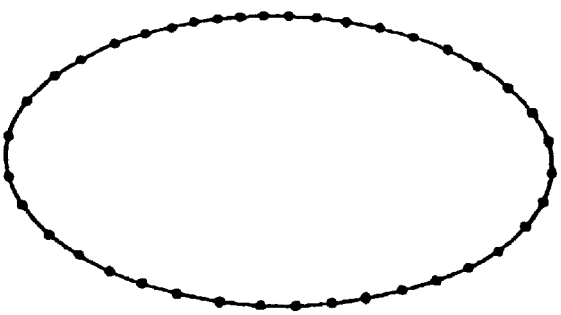
Figure 8C:
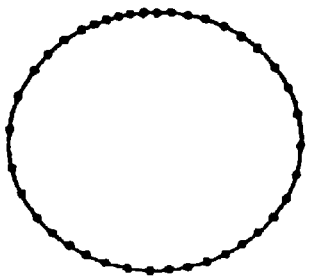

Thereafter, the operations in the above formulae (10)–(36) may be executed. FIGS. 8A and 8B illustrate a pupil configuration and a pixel configuration of the area sensor assuming a rectangular pixel configuration before the transform. Further, the pupil edge coordinates after the transform are as shown in FIG. 8C.

Figure 9A:
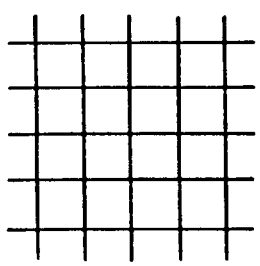
FIGS. 9A and 9B are diagrams illustrating the pixel configuration and the pupil configuration when the area sensor of FIGS. 8A, 8B and 8C assumes a square pixel configuration.
Figure 9B:
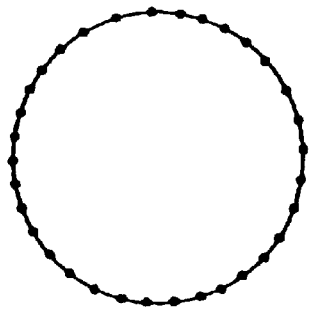

Note that vertical and horizontal pixel pitches are equal to each other in the case of the rear sensor, assuming a square pixel configuration as shown in FIG. 9A. Hence, if the pupil circle is obtained in an on-sensor address of the sampled pupil edge, the pupil circle can be correctly obtained as in FIG. 9B. The above transform process becomes, therefore, unnecessary.

If the Purkinje image position and the pupil position can be detected from the eyeball image of the photographer in step 206 of FIG. 6, a visual axis direction of the photographer or view point coordinates on a focusing screen can be calculated from the formula (5) in step 207. A visual axis detection subroutine is therefore returned (step 208).

In the first embodiment discussed above, as a variation quantity for obtaining the barycenter, the primary difference is taken as in the formula (6). Depending on the characteristic of the pupil edge or a property of noise, however, for instance, the primary difference may be given in a different manner as follows:

$$e(k)=d(k-1)+d(k-1)-d(k)-d(k+1) \tag{6-2}$$

Figure 10:
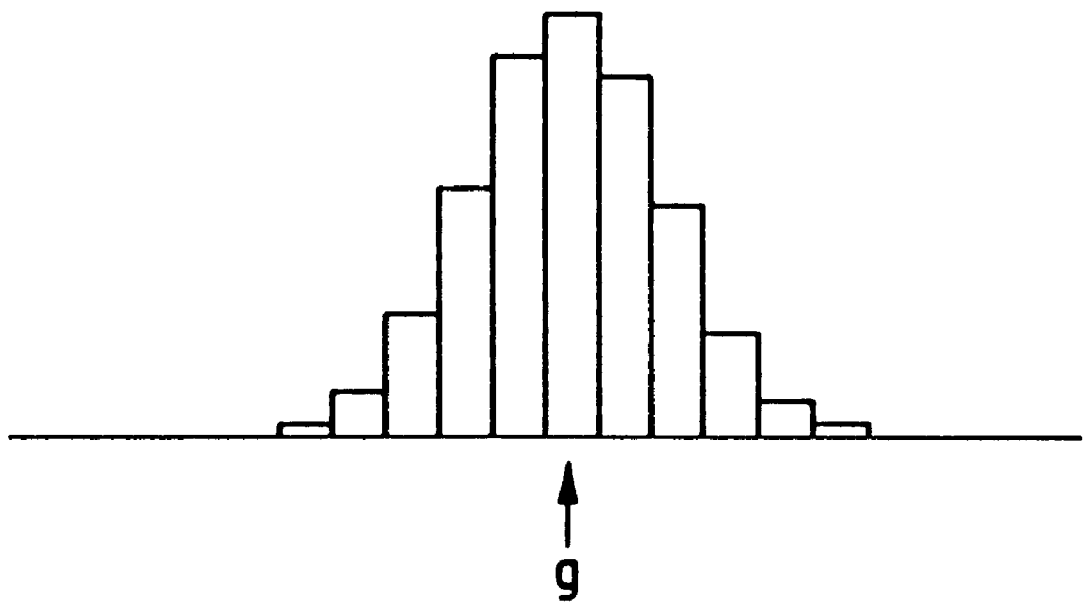
FIG. 10 is a diagram for explaining how the extracting process of the pupil edge is performed in a second embodiment of this invention.

FIG. 10 illustrates plotting of e(k) based on this formula and the barycenter g (this is a filter output signal of the photoelectric converting signal).

Note that others are the same as with the first embodiment, and hence the explanations thereof will be omitted herein.

In accordance with each of the embodiments discussed above, the variation quantity of the eyeball video signal is obtained. The edge coordinates are determined involving the multiplicity of signals, wherein the barycentric coordinates of the variation quantity serve as the pupil edge coordinates. The pupil edge extracting is thus conducted, and, therefore, influences by noise can be reduced.

It is apparent that, in this invention, a wide range of different working modes can be formed based on the invention without deviating from the spirit and scope of the invention. This invention is not restricted by its specific working modes except being limited by the appended claims.

What is claimed is:

1. A visual axis detecting apparatus comprising:

a two-dimensional image sensor having a plurality of detecting lines for receiving light from an eye of an observer;

extracting means for detecting a change of luminance for a group of neighboring pixels on each of the detecting lines, and extracting a position of a center of gravity of luminance change as a coordinate of an edge of a pupil of the eye on the basis of a number of pixels whose luminance is changed and an amount of luminance change;

correction calculating means for performing a correction calculation, which is based on an aspect ratio of a pixel of said image sensor, with respect to a plurality of coordinates of edges of the pupil of the eye extracted by said extracting means;

pupil center calculating means for calculating a position of a center of the pupil from the plurality of coordinates of edges of the pupil corrected by said correction calculating means, using a least squares method; and visual axis calculating means for calculating a position of a visual axis of the observer by using the position of the center of the pupil.

2. An apparatus according to claim 1, further comprising means for detecting a position of a corneal reflection from an output of said image sensor, and wherein said visual axis calculating means calculates the visual axis in accordance with a position of the corneal reflection and the position of the center of the pupil.

3. A visual axis detecting method using a two-dimensional image sensor having a plurality of detecting lines, comprising the steps of:

detecting a change of luminance for a group of neighboring pixels on each of the detecting lines, and extracting a position of a center of gravity of luminance change as a coordinate of an edge of a pupil on the basis of a number of pixels whose luminance is changed and an amount of luminance change;

performing a correction calculation, which is based on an aspect ratio of a pixel of said image sensor, with respect to a plurality of coordinates of edges of the pupil of the eye extracted in said extracting step;

calculating a position of a center of the pupil from the plurality of coordinates of edges of the pupil corrected in said correction calculating step, using a least squares method; and calculating a position of a visual axis of the observer by using the position of the center of the pupil.

4. A visual axis detecting apparatus comprising:

a two-dimensional image sensor for receiving a light reflected from an eye of an observer;

extracting means for extracting a plurality of edges of a pupil of the eye from a received image of said image sensor;

correction calculating means for performing a correction calculation, which is based on an aspect ratio of a pixel of said image sensor, with respect to a plurality of edges of the pupil of the eye extracted by said extracting means;

pupil center calculating means for calculating a position of a center of the pupil from the plurality of edges of the pupil corrected by said correction calculating means, using a least squares method; and visual axis calculating means for calculating a position of a visual axis of the observer by using the position of the center of the pupil.

5. An apparatus according to claim 4, further comprising means for detecting a position of a corneal reflection from an output of said image sensor, and wherein said visual axis calculating means calculates the visual axis position from a position of the corneal reflection and a position of the center of the pupil.

6. A visual axis detecting apparatus comprising:

a two-dimensional image sensor having a plurality of detecting lines for receiving light reflected from an eye of an observer;

extracting means for detecting a change of luminance for a group of neighboring pixels on each of the detecting lines, and extracting a position of a center of gravity of luminance change as a coordinate of an edge of a pupil of the eye on the basis of a number of pixels whose luminance is changed and an amount of luminance change;

correction calculating means for performing correction calculation, which is based on an aspect ratio of a pixel of said image sensor, with respect to a plurality of coordinates of edges of the pupil of the eye extracted by said extracting means;

pupil center calculating means for calculating a position of a center of the pupil from the plurality of coordinates of edges of the pupil corrected by said correction calculating means; and visual axis calculating means for calculating a position of a visual axis of the observer by using the position of the center of the pupil.

7. An apparatus according to claim 6, further comprising means for detecting a position of a corneal reflection of the eye of the observer from an output of said image sensor, and wherein said visual axis calculating means calculates the visual axis position based on the position of the corneal reflection and a position of the center of the pupil.

8. A visual axis detecting apparatus comprising:
- a two-dimensional image sensor for receiving a light reflected from an eye of an observer;
- pupil edge extracting means for extracting a plurality of edges of a pupil of the eye from a received image of said image sensor;
- correction calculating means for performing a correction calculation, which is based on an aspect ratio of a pixel of said image sensor, with respect to a plurality of edges of the pupil of the eye extracted by said pupil edge extracting means;
- pupil center calculating means for calculating a position of a center of the pupil from the plurality of edges of the pupil corrected by said correction calculating means; and
- visual axis calculating means for calculating a position of a visual axis of the observer by using the position of the center of the pupil.

9. An apparatus according to claim 8, further comprising means for detecting a position of a corneal reflection image from an output of said image sensor, and wherein said visual axis calculating means calculates the visual axis position from the position of the corneal reflection image and the position of the center of the pupil.

* * * * *

UNITED STATES PATENT AND TRADEMARK OFFICE
CERTIFICATE OF CORRECTION

PATENT NO.   :   5,987,151

DATED         :   November 16, 1999

INVENTOR(S) :   AKIRA AKASHI

It is certified that error appears in the above-identified patent and that said Letters Patent is hereby corrected as shown below:

COLUMN 1
Line 38, "bean" should read --beam--.

COLUMN 5
Line 40, "sub mirror 3" should read --sub-mirror 3--; and
Line 52, "aperture 62" should read --aperture 6e--.

COLUMN 9
Line 53, "square" should read --squares--.

COLUMN 10
Line 18, "(25)-(26)" should read --(23)-(24)--.

Signed and Sealed this

Fifth Day of December, 2000

Attest:

Q. TODD DICKINSON

*Attesting Officer*    *Director of Patents and Trademarks*